June 6, 1972 J. E. WHELAN 3,667,775
SEMICLOSED LOOP AUTOMATIC LEVELING SYSTEM
Filed Sept. 21, 1970 2 Sheets-Sheet 1

INVENTOR.
James E. Whelan
BY
J.C. Evans
ATTORNEY

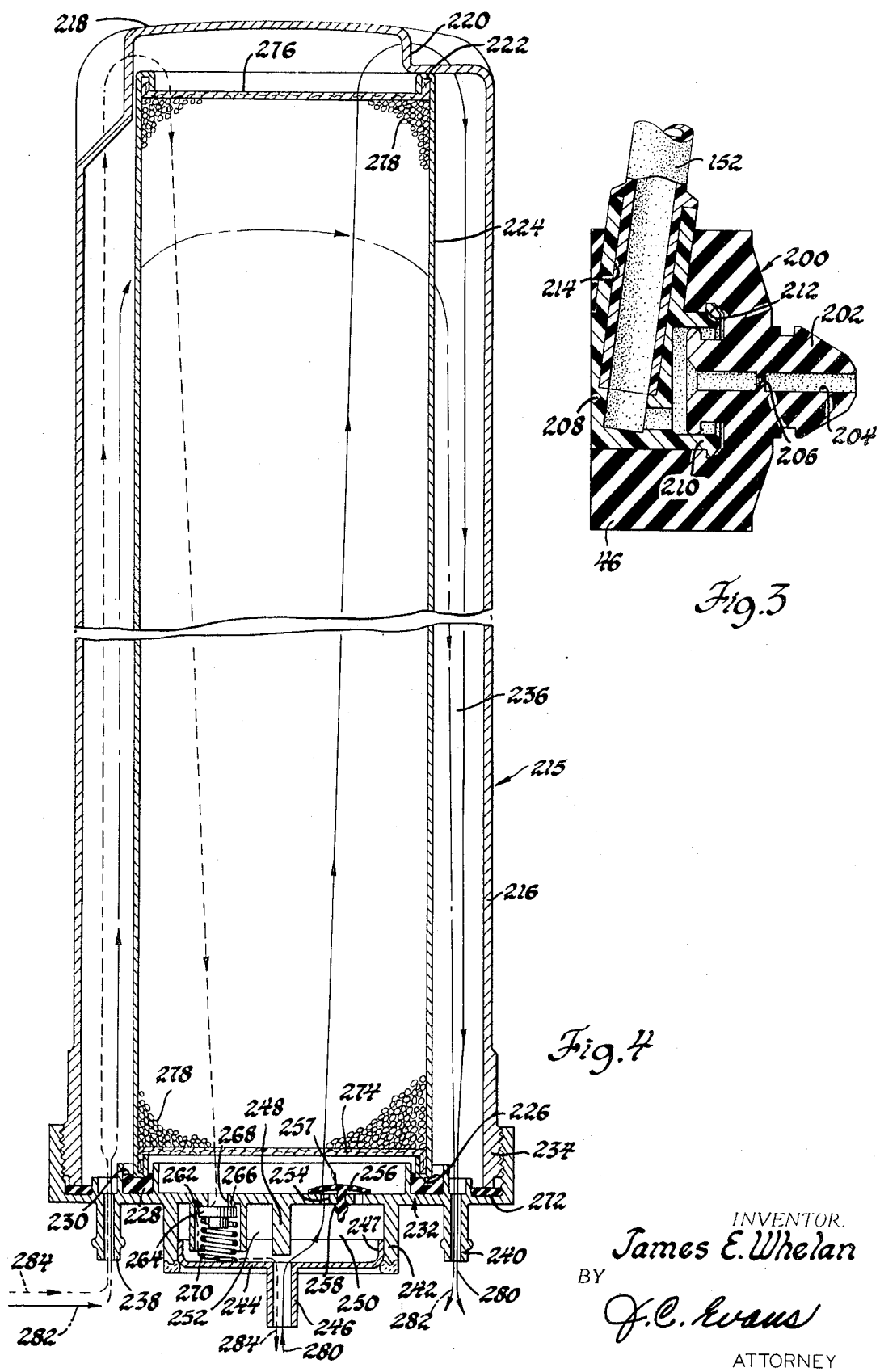

United States Patent Office 3,667,775
Patented June 6, 1972

3,667,775
SEMICLOSED LOOP AUTOMATIC LEVELING SYSTEM
James E. Whelan, Dayton, Ohio, assignor to General Motors Corporation, Detroit, Mich.
Filed Sept. 21, 1970, Ser. No. 73,963
Int. Cl. B60g 17/04
U.S. Cl. 280—124 F    3 Claims

ABSTRACT OF THE DISCLOSURE

In preferred form, a vehicle leveling system compressor operated proportional to vehicle engine speed to direct compressed air into a pressurizable air control chamber of a leveler unit. An exhaust opening from the leveler unit is controlled by an undamped on-off exhaust valve continually operated in response to normal vehicle road movements and changes in loading to effect an on-off ratio for exhaust flow from the control chamber into an air collector tank. The air collector tank serves to collect excess air dumped from the leveler unit to prevent exhaust to atmosphere during dynamic operation. An intake valve and a relief valve on the tank and a desiccant cartridge in the tank cooperate to eliminate water in the system during its operation.

---

This invention relates to automatic vehicle leveling systems and more particularly to leveling systems having air flow therethrough controlled by an on-off undamped valve assembly which exhausts air from the leveler unit during vehicle operation.

In low cost, automatic vehicle leveling systems it is desirable to control the amount of pressurized air in the air control chamber of the pneumatic leveler unit by means of an undamped, on-off valve assembly which is responsive to the height relationship between the sprung and unsprung mass of a vehicle.

Such arrangements include a movable valving element which is opened and closed at a ratio which corresponds to the load on the vehicle. With such arrangements there is a large volume passage of air through the control chambers during vehicle operation.

When the air compressor for supplying air to such a system has the inlet thereof directly communicated with atmosphere this large volume of air flow through the system can cause an appreciable amount of moisture condensation which then can freeze in low points in the system to block air flow between the air supply and the leveler unit of the system.

One way to avoid moisture buildup in automatic pneumatic type vehicle leveling systems is to have an air compressor and air control chambers of the leveler connected in a closed fluid circuit wherein a charge of dry air, nitrogen or other gas is continuously circulated through the system during its operation.

Another approach is to use a system that has a limited communication with atmosphere and is operative to draw only a limited amount of makeup air from atmosphere as required to pump up the vehicle during each phase of operation. This system like the open system, will draw moisture into the system which can freeze to block conduits.

Yet another approach is to have the inlet of a compressor in an automatic leveling system directly in communication with atmosphere and its outlet in communication with the air control chamber of a pneumatic type leveler unit; in this type of system a damped three position control valve is located between the compressor, atmosphere and the leveler unit and it is operative when the vehicle is level to block fluid flow to or from the leveler unit during normal vehicle road movements. When a load is removed from vehicle the three position valve assumes an exhaust position wherein air flows from the leveler unit to atmosphere and when the vehicle is loaded it assumes a pump-up position wherein air is directed from the compressor into the leveler unit for building up the pressure therein. The damped three position valve is an expensive component in such systems and while it eliminates large volume air flow through the system it nevertheless allows a certain amount of moist air to pass into the system which can collect and freeze in low points of the system conduits to block fluid flow therethrough.

Accordingly an object of the present invention is to provide a semiclosed automatic vehicle leveling system which has an air dryer assembly and undamped exhaust control valve which cooperate to dry outside air during leveling and then minimize use of outside air during dynamic operation of the system; and which system includes an orifice control of exhaust which minimizes the size of a collector tank which stores exhaust air during the dynamic operation.

Another object of the present invention is to maintain dry air conditions in a low cost automatic vehicle leveling system charged with dry air by the provision of a compressor for discharging dry air directly into the air control chamber of a pneumatic leveler unit which has an outlet therefrom under the control of an undamped, two-position exhaust valve which is responsive to normal vehicle road movements and operative to exhaust excess air from the leveler unit and wherein the exhaust of excess air from the leveler unit is also controlled by an orifice that regulates the amount of air dumped from the pneumatic leveler unit back to a collector tank; the orifice is large enough to prevent excessive pressure build-up in the leveler to cause harsh ride under low vehicle load operation and the orifice is small enough to avoid excessive exhaust when the vehicle is heavily loaded and the undamped valve opens; the tank is sized to collect all excess exhaust air from the leveler unit during dynamic operation of the vehicle for reuse in the system without passing to and from atmosphere during dynamic operation.

Another object of the present invention is to maintain dry air conditions within a semiclosed automatic vehicle leveling system by the provision of an improved air intake and exhaust assembly that serves to dry inlet air during a pump-up phase of operation which charges the system; the assembly including a tank sized to collect excess exhaust air that is dumped from a pneumatic leveler unit in response to normal road movements and a relief valve having an exhaust phase of operation to direct air from the system to atmosphere along with moisture previously removed from the air charge during the pump-up phase of operation.

Another object of the invention is to maintain dry conditions in a semiclosed automatic vehicle leveling system wherein there is no water condensation at dew point temperatures above the minimum temperature of system operation by directing outside air into the system during a pump-in phase through a desiccant cartridge in a collector tank for drying intake air during the pump-up phase; thereafter operating a pneumatic leveler unit in the system under the control of means including an exhaust orifice, an undamped, on-off exhaust valve and an exhaust collector tank sized to prevent excess air flow to atmosphere under normal dynamic vehicle operation following leveling and additionally including means that exhaust excess air in the system when the vehicle is unloaded through the desiccant cartridge for partial regeneration of the desiccant cartridge.

Yet another object of the present invention is to provide a low cost automatic vehicle leveling system having a collector tank in a semiclosed system wherein the tank is sized to minimize dynamic air usage with an undamped control valve by holding excess air dumped from the leveler unit by the undamped, on-off exhaust valve in response to normal road movements and wherein a relief valve is included in the tank which is operative only when the vehicle is unloaded to exhaust air from the pneumatic leveler until a low pressure condition exists therein to cause a smoother vehicle ride under light vehicle loading conditions.

These and other objects of the present invention are attained in one working embodiment which includes a cam operated compressor mounted on the side of an engine block and operated by an engine cam to reciprocate a piston within a cylinder filled with oil. Reciprocation of the piston forces oil into and out of the cylinder against one side of a flexible pump diaphragm which is oscillated thereby to draw air into and discharge air from a compression chamber. The compressor exhaust is directly connected to the inlet of the air control chamber of a pneumatic leveler unit connected between sprung and unsprung masses of the vehicle. An outlet from the leveler directs excess air flow from the compressor through the pneumatic leveler unit back to an air collector tank which is directly connected back to the inlet of the compressor.

During operation a two-position, undamped exhaust valve on the leveler unit opens and closes its outlet to control flow of air to and from its air control chamber. A control orifice regulates the amount of air flow from the leveler unit when the exhaust valve is open to prevent excessive exhausting of air therefrom. The collector tank is sized to prevent air from being exhausted from the system when the undamped valve is open and closed in response to normal road movements between the sprung and unsprung masses.

The collector tank also includes a desiccant cartridge therein through which air is directed from a one-way inlet check valve during a pump-up phase of operation to remove moisture from makeup fluid which is used to charge the system.

During normal vehicle operation in response to normal movements between the sprung and the unsprung mass, excess air from the pneumatic leveler is shunted directly through the collector tank to the compressor inlet and the tank itself is sized to prevent a pressure buildup therein above a predetermined pressure. The tank further includes a relief valve which is operative when the vehicle is unloaded to direct excess air from the system back through the desiccant cartridge to partially regenerate the cartridge following each loading and unloading of the vehicle.

Further objects and advantages of the present invention will be apparent from the following description, reference being had to the accompanying drawings wherein a preferred embodiment of the present invention is clearly shown.

In the drawings:

FIG. 3 is an enlarged vertical cross-sectional view of a valve fitting and coupling member in the system of FIG. 1; and FIG. 4 is a view in vertical section of another embodiment of air dryer and collecting tank for drying air in a vehicle leveling system.

Figure 1:
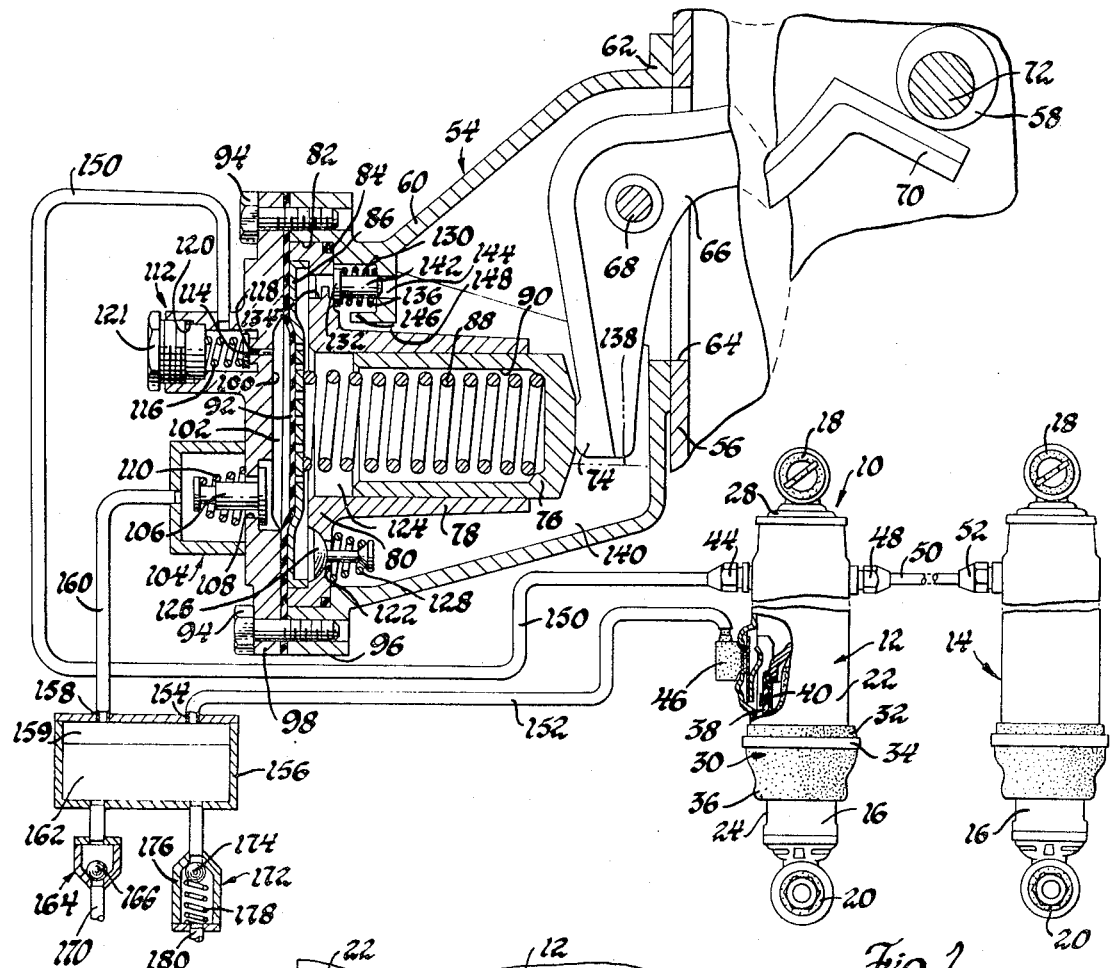
FIG. 1 shows an automatic vehicle leveling system with an air compressor in vertical section diagrammatically associated with pneumatic leveler units and an air dryer assembly and collecting tank which removes moisture from air in the system.

Referring now to the drawings, in FIG. 1, a vehicle leveling system 10 is illustrated that includes a pair of pneumatic leveler units 12, 14.

Each of the pneumatic leveler units is located between the sprung and unsprung masses of the vehicle; for example, between the rear frame of a vehicle chassis and the axle housing of a rear suspension system having ground engaging wheels.

More particularly, each of the pneumatic leveler units 12, 14 includes a shock absorber 16 having a top ring mount 18 and a bottom ring mount 20 for connecting the unit between the sprung and the unsprung masses. An outer cylindrical member 22 is located in surrounding relationship with the outer cylinder 24 of the shock absorber 16. A piston rod 26 extends from the cylinder 24 and is connected by a cap 28 to the outer cylindrical member 22.

A flexible sleeve 30 has an outer end 32 thereon secured by a clamp ring 34 to the lower end of the outer cylindrical member 22. It includes a roll segment 36 joined to an inside end 38 of the flexible member 30 which is secured by a clamp ring 40 to the outer surface of the cylinder 24.

The outer cylindrical member 22, the shock absorber 16 and flexible sleeve 30 together form a sealed variable volume, pressurizable air control chamber 42 which can be pressurized to produce a resultant force between the top and bottom ring mounts 18, 20 that will serve as an auxiliary load support to a primary vehicle suspension spring at each of the leveler units 16 between the sprung and the unsprung masses of the vehicle.

The cylindrical member 22 of the control chamber 42 of the leveler unit 12 includes an inlet fitting 44 and an exhaust fitting 46. It also includes a fitting 48 connected to a cross-over tube 50 which in turn is connected to an inlet fitting 52 which supplies air to a control chamber in the pneumatic leveler unit 14 which is identical to that shown in the pneumatic leveler unit 12.

In accordance with certain principles of the present invention, air is supplied to the control chambers of the leveler units 12 and 14 from a vehicle engine cam operated compressor 54, which is preferably supported on an engine block 56 of a motor vehicle to be driven by an engine cam member 58 which is driven at a speed proportional to the engine speed.

More particularly, the compressor 54 includes a housing 60 which has its base 62 secured to the block 56 to overlie an opening 64 therein through which is directed an operating arm 66 for the compressor 54.

A shaft 68 pivotally supports the operating arm 66 on the housing 60 and locates a distal end 70 thereon in driving engagement with the outer surface of the cam element 58 so that as the cam element 58 is rotated by the cam shaft 72 it will oscillate the distal end 70 about the shaft 68 to cause oscillating movement of a pump drive end 74 of the arm 66 located within the housing 60. The end 74 engages a piston 76 which is slideably sealingly located within a cylindrical extension 78 on a pump cylinder head 80 for reciprocation therein.

The cylinder head is supportingly received in an open end 82 of the housing 60 and sealed with respect thereto by an O-ring element 84.

A perforated backup plate 86 is press fit in the open end of the cylinder head 80 and engages one end of a piston return spring 88 which has the opposite end thereof directed into a bore 90 through the piston 76 whereby the piston 76 is spring biased outwardly of the cylindrical extension 78 against the end 74 of the operating arm 66.

A pump diaphragm 92 of flexible material has the outer periphery thereof fastened by means of screw elements 94 directed therethrough between the outer flange 96 of the housing 60 and the outer periphery of a cover plate 98 which includes a recessed surface 100. It and the diaphragm 92 define an air compression chamber 102.

The cover plate 98 supports an inlet valve assembly 104 which includes a movable valve element 106 seated around an opening 108 into the chamber 102 and biased into a closed position by a conical spring 110.

During an intake stroke the valve element 106 is moved against the spring 110 from seated sealed engagement with the cover 98 to open the passageway 108 thereby to allow intake air flow into the chamber 102.

Additionally, the coved 98 supports an outlet valve assembly 112 which includes a movable valve element 114 biased closed by a spring element 116 against a seat around an outlet opening 118 from the variable volume air chamber 102. In the illustrated arrangement, the valve element 114 is accessible through a threaded bore 120 closed by a threaded cap 121. When air is discharged from the chamber 102 the valve element 114 is moved away from the seat to open the outlet 118.

In the illustrated arrangement, there is a volume of oil in the housing 60 maintained at a level to cover an oil inlet passageway 122 through the head 80.

The passageway 122 defines an inlet to an oil chamber 124 within the cylindrical extension 78. The passageway 122 is under the control of an oil inlet valve element 126 which is normally biased closed against a seat around the opening 122 by a light spring 128.

The compressor 54 further includes a relief valve assembly 130 from the oil chamber 124 comprising a valve element 132 located in an opening 134 in the head 80. It includes a portion thereof in seal seated engagement wth a seat around the opening 134. The valve element 132 is maintained in its seated sealed relationship around the opening 134 by a relief valve spring 136.

One feature of the relief valve assembly is that it is located above the upper oil surface 138 in a sump 140 within the housing 60. The valving assembly 132 includes a stem 142 which is guidingly received within a bore 144 in an L-shaped baffle member 146 that forms a labyrinth path 148 for directing relief oil flow from the oil chamber 124 along the outside surface of the extension 78 thereby to flow back into the oil sump 140 without causing turbulence at the oil surface 138 that can cause oil aeration of frothing which might adversely affect the oil pumping action of the piston 76 during operation of the compressor 54.

In accordance with certain principles of the present invention, the cam operated compressor 54 is especially suited for use in the vehicle leveling system 10 of the present invention. The compressor 54 is engine speed responsive and will have an output capacity under idle engine speeds that is sufficient to maintain an adequate pressure within the leveler units to produce an auxiliary load carrying capacity that will supplement that of the main suspension springs to return a vehicle chassis to a level position when loaded.

More particularly, the cam operated compressor 54 is characterized as having a resultant force effect on the cam 58 like that of a common cam operated gasoline pump of the type presently used on automotive vehicles, and thereby, in vehicles that have an electric fuel pump, the compressor can occupy a cam operated gasoline pump location on the engine block 56 to serve as a high volume pressurized air source that will not affect engine operation or require modifications to its design.

In automatic vehicle leveling systems it has been commonplace to include relief valve provisions to prevent overpressurization of the system.

In accordance with certain other principles of the present invention, this capacity is built into the cam operated compressor 64 in the form of the relief valve assembly 130.

Thus, in operation, as the cam 58 causes the arm 66 to oscillate about the shaft 68 the piston 76 will be reciprocated in the cylinder to draw oil from the sump 140 through the inlet valve asembly 126 into the oil chamber 124 as it is expanded during movement of the piston 76 outwardly of the cylinder 78 by the return spring 88. At this point, which constitutes an oil intake stroke, the pump diaphragm 92 assumes the position shown in FIG. 1, thereby to produce a suction stroke on the air side of the diaphragm to cause air to be drawn into the air chamber 102.

The oil inlet valve assembly 126 does not open until the diaphragm 92 engages the backup plate 86 to assure that the air chamber 102 will be completely filled with air.

Another feature of the arrangement is that the piston 76 can move outwardly of the cylindrical extension 78 to an over-travel position. Inlet valve 126 directs oil from the sump 140 into the oil chamber 124 if the piston 76 assumes the over-travel position. Over-travel occurs because of manufacturing tolerance differences in the various compressor parts. The fact that the chamber 124 fills with oil on over-travel will maintain volumetric efficiency on the air side of the compressor.

On the discharge air stroke and oil stroke, initial movement of the piston 76 interiorly of the cylindrical extension 78 causes oil flow through the openings in the perforated stop or backup plate 86 against the oil side of the diaphragm 92 to force it in the direction of the recessed surface 100 in the cover plate 98. This pressure buildup continues until there is an increase of pressure in the oil chamber 124 which is sufficient to open the relief valve assembly 130. The pressure relief point of the valve assembly 130 establishes the maximum air pressure buildup within the system 10 between the cam operated compressor 54 and the leveler units 12, 14. The maximum pressure is attained when the vehicle is at full rated load or overloaded.

When the piston moves outwardly of the extension 78, the pressure in the air chamber 102 rapidly drops causing the inlet valve assembly 104 to open prior to opening of the oil inlet valve assembly 126.

Thus, in this system the valving arrangement on the oil and air side of the diaphragm 92 serve dual control functions including a relief function to control the maximum pressure buildup on the air side between the compressor 54 and the leveler units and a control function that will enable the piston to over-travel in both its suction and discharge strokes with respect to the cylindrical extension 78 to assure that the air chamber is completely filled and exhausted as the diaphragm moves to opposite sides of the chamber 102.

The system 10 further includes an air supply conduit 150 which connects to the air outlet valve assembly 112 and to the inlet fitting 44 directly to the pneumatic leveler unit 12 and thereby through the cross-over tube 50 to the control chamber of the pneumatic leveler unit 14.

The system 10 further includes a return conduit 152 from the outlet fitting 46. This connects to the inlet 154 of an air return tank 156. The air return tank 156 includes an outlet fitting 158 in communication with inlet 154 through a passageway 159. Fitting 158 is directly connected by a conduit 160 to the air inlet valve assembly 104.

In accordance with certain principles of the present invention, the improved system has an air supply including the return tank 156 and a cartridge 162 of a moisture removing desiccant therein, for example, silica gel. The passageway 159 directly shunts the cartridge 162 between inlet 154 and outlet fitting 158 so that air flow therebetween will not pass through the cartridge 162.

An inlet one-way check valve 164 to the tank 156 communicates with atmosphere and is located on the tank 156 so that when air is drawn across a ball element 166 of a one-way check valve 164 into the tank 156 it passes through the desiccant cartridge 162 prior to passing outwardly of the tank 156.

Additionally, the unit includes a tank pressure relief valve 172 which includes a ball valve element 174 maintained in seated engagement with a valve housing 176 by a spring 178 to be operative to prevent inlet air flow through an atmospheric inlet 180 into the interior of the air tank 156.

The system further includes an exhaust valve assembly 182 with an undamped valve which opens and closes in response to changes in the height relationship betwen the sprung and unsprung mass for producing an open-to-closed ratio of air flow control through the exhaust fitting 46 during dynamic operation of the vehicle. The valve assembly 182 further includes a restricted orifice means sized wtih respect to the displacement of cam operated compressor 54 to regulate the amount of exhaust of excessive air flow from the pneumatic leveler units 12, 14 during dynamic vehicle operation following leveling.

Figure 2:
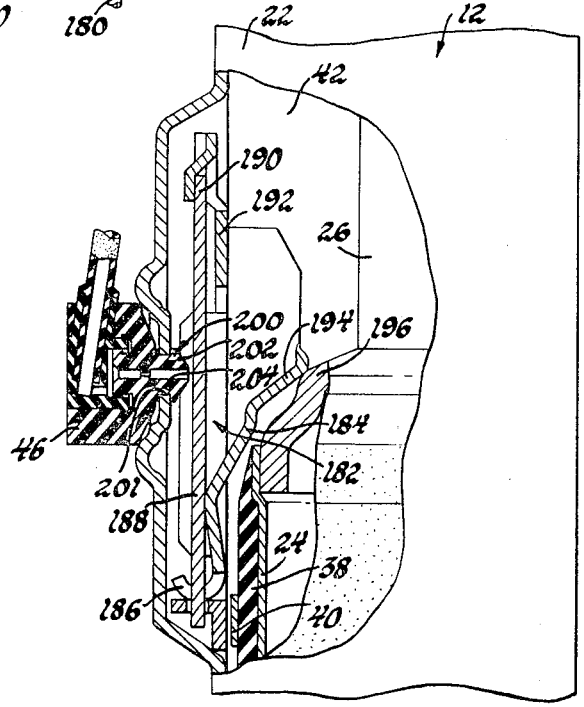
FIG. 2 is an enlarged fragmentary view in vertical section showing an undamped on-off exhaust valve in the system of FIG. 1.

More particularly, the exhaust valve assembly 182 is integrally formed as part of leveler unit 12 and is undamped thereby to immediately respond to normal road movements between the sprung and the unsprung mass. As shown in FIG. 2, it includes an actuator arm 184 which has a curved end 186 which connects to one end of an elongated spring valve member 188 which has its upper end 190 fixedly secured to a bracket 192. The spring valve member 188 is flexed by the actuator arm 184 as the inside end 194 thereof is moved with respect to the upper end cap 196 of the shock absorber 12 and the outer surface of the shock absorber cylinder 24.

The valve assembly 182 is located in an outwardly bulged segment of the outer cylindrical member 22 of the pneumatic leveler unit 12. This portion of the leveler unit is movable with piston rod 26 and when the vehicle is unloaded so as to cause the vehicle chassis to move upwardly with respect to the unsprung mass of the suspension assembly the top and bottom end mounts 18, 20 are separated from one another thereby to cause the component parts of the valve assembly to move upwardly away from the upper end 196 of the shock absorber 16. This will cause the actuator arm 184 to move into the position shown in FIG. 2 and thereby position the spring element 188 in spaced relationship to a unitary resilient valve seat element 200 which is fixedly seated through an opening 201 in the outer cylindrical member 22.

The resilient valving element 200 includes a flexible nose portion 202 having an axial passageway 204 with a reduced cross-section control orifice 206 which regulates exhaust flow of excess air flow from the leveler units 12, 14 when the valve assembly 182 is open. The orifice 206 is sized to be big enough to exhaust sufficient air when the vehicle is lightly loaded to prevent a pressure build-up in the leveler units that might produce harsh vehicle ride; the orifice 206 is also sized to be small enough to prevent too rapid exhaust from the leveler units when the vehicle is heavily loaded and the valve is opened.

In the illustrated arrangement, the outlet fitting 46 is in the form of a right angle fitting 208 which has an inlet end 210 thereon seated within a bore 212 of the unitary valve seal element 200 to seal thereagainst and define a path to an outlet passageway 214 in which one end of the return conduit 152 is sealingly fixed.

When the vehicle is loaded the sprung mass is moved downwardly with respect to the unsprung mass and the end mounts 18, 20 are moved closer together. This causes the outer cylindrical member 22 to telescope downwardly over the shock absorber 16 so that the actuator arm 184 of the undamped valve assembly 182 will move against the outer surface of the cylinder 24 and thereby press outwardly on the spring element 188 to cause it to flex into a position where it closes the passageway 204 through the valving element 200.

Movement of the valving element 188 between its opened and closed positions is undamped and therefore when the vehicle is at a desired height relationship and the end mounts 18, 20 are at a desired predetermined height relationship therebetween any transient road movement which will cause the end mounts 18, 20 to move either apart from one another or toward one another will cause an opening and closing movement of the spring element 188.

The undamped valve assembly 182 is characterized by the fact that when the vehicle is heavily loaded it will remain closed for a greater period of time than when it is opened; likewise when the vehicle is lightly loaded it will remain opened more than it will stay closed and at intermediate loads there will be a ratio of the valve opened period to closed period which will be intermediate the ratios at heavy or light load conditions.

More particularly as shown in FIG. 2 the vehicle is almost at its level position and the actuator arm 184 is on the top of the cap 196 and the spring valve element 188 is opened. Any slight load increase will cause the actuator arm 184 to move toward the spring element 188 to flex it into the closed position. When the vehicle is lightly loaded, ordinary low amplitude, high frequency road induced movement between the sprung and unsprung mass will cause the actuator arm 184 to continually move between these points but for the most part the valve will be opened.

When the vehicle is heavily loaded the actuator arm 184 will be positioned along the side wall of the shock absorber 16 and will thereby only be opened and closed in response to larger road induced movements between the sprung and unsprung mass and under these conditions the valve will remain closed for a greater period of time.

When the vehicle is in an intermediate state the valve will open in response to both low amplitude road induced movements and intermediate road induced movements and thereby will be closed for a lesser period of time than when the vehicle is heavily loaded.

Before discussing the operational characteristics of the system reference to FIG. 4 will show details of an air dryer assembly 215 which is suitable for inclusion in the system at the location of air return tank 156. It includes an outer cylindrical housing 216 opened at one end and closed by an integral cap 218 at its opposite end.

The cap 218 includes a plurality of circumferentially located indentations 220 thereon which serve to define a supporting seat for one end 222 of a cylindrical desiccant cartridge 224. The desiccant cartridge 224 extends from the supported end 222 to an open end 226 which sealingly engages a resilient O-ring element 228 supported within an annular groove 230 formed in the inside face of an end closure cap 232. The end closure cap 232 is threaded and is threadably received on the open end 234 of the outer cylindrical housing 216.

The outside diameter of the cylindrical filter cartridge 224 is less than the inside diameter of the outer cylindrical member 216 to form an annular space 236 completely around the filter cartridge 224.

The space 236 constitutes a shunt passageway between an inlet tube 238 on the cap 232 and an outlet tube 240 thereon.

The inlet tube 238 and outlet tube 240 correspond to the inlet fitting 154 and the outlet 158 of the air return tank shown in FIG. 1.

They are adapted to be connected in the same location within an automatic vehicle leveling system of the type discussed.

The end closure member 232 includes an outwardly directed cylindrical housing 242 thereon which is closed by a cover plate 244 that has a peripheral edge sonically welded to the end of the housing 242. The cover 244 includes a tubular extension 246 in communication with atmosphere and spaced, circumferential, guide shoulders 247 that center it within housing 242.

The cover 244 is spaced from crossed reinforcing ribs 248 on the outside of the end closure member. The interior of the cylindrical housing 242 is separated by the ribs into an inlet space 250 on one side thereof and an exhaust space 252 on the other side thereof.

The inlet space 250 communicates with the lower opened end of the cartridge 224 through inlet openings 254 which are closed by a flap 256 on a resilient umbrella vave 257 that has its base 258 fixedly secured to the end closure member whereby the flap 256 is spring biased in sealed engagement with the inside surface of the closure member 232 in overlying relationship to the inlet openings 254.

A tank pressure relief valve assembly 262 is included in the exhaust space 252. It includes a movable valving element 264 which is maintained in sealed, seated relationship with an annular seat 266 on the closure member around an outlet opening 268 therein. A coil spring 270 fits over the movable valving element 264 to maintain it in sealed engagement with the seat 266 during normal road movements of the vehicle as will be discussed.

The unit further includes a seal gasket 272 for sealing between the closure member 232 and the outer cylindrical member 216.

In the illustrated arrangement the cartridge 224 includes a filter member 274 in the inlet end thereof and a filter member 276 in the outlet end thereof.

The cartridge 224 is filled with a suitable desiccant material 278 such as a 6–16 mesh silica gel for removing water from air passing therethrough.

The operation of the improved vehicle leveling system 10 has three distinct phases including the following:

Pump-up phase

This phase of operation occurs when the vehicle is loaded and its engine is run. When the vehicle is loaded the sprung mass or chassis of the vehicle compresses the main suspension spring to cause the length thereof to be shortened. This causes the top and bottom ring mounts 18, 20 of the pneumatic leveler units to move closer to one another. The undamped valve assembly 182 has its spring element 188 deflected by the actuator arm 184 to close the passage through the resilient valving element 200. At this point the vehicle chassis is below a desired predetermined height relationship or curb height. When the vehicle engine is started the cam element 58 will be driven by the camshaft 72 to cause the operating arm 66 to pivot about the shaft 68 thereby causing the pump drive end 74 to reciprocate the piston 76 within the cylindrical extension 78. This will cause compressed air to be discharged from the air compression chamber 102 through the supply conduit 150 directly into the air inlet fitting 44 to the control chamber 42 of the pneumatic unit 12 and thence through the cross-over tube 50 to a like control chamber in the pneumatic leveler unit 14.

Each time the vehicle is started up the compressor 54 pumps up against the pressure within the control chambers 42. The pressure within the control chambers of the pneumatic leveler units 12, 14 is automatically bled from chambers 42 to atmosphere through valve assembly 172 each time that the engine is turned off and the vehicle is unloaded.

The low pressure within the control chambers 42 at the start of the pump-up phase means that there is little air within the semiclosed leveling system 10 which can be directed into chambers 42 for increasing the pressure therein. For this reason, during the pump-up phase, the compressor 54 draws air from atmosphere through the inlet tube 170 across the one-way inlet check ball element 166, thence through the cartridge 162, the outlet fitting 158, the conduit 160 and through the inlet valve assembly 104. The desiccant cartridge 162 is interposed to remove moisture from the intake air during the pump-up phase. The compressor 54 continues to draw air from outside the system until the pressure within the control chambers 42 is raised sufficiently to produce an auxiliary load support action by the pneumatic leveler units 12, 14 that will supplement that of the primary suspension springs to cause the vehicle chassis to be moved upwardly away from the unsprung mass to return the chassis to a desired curb height or level relationship with respect to unsprung parts of the vehicle suspension.

The pump-up time period depends upon the speed of operation of the vehicle. When the vehicle is at a curb position and the engine operated at idle speeds the discharge rate of the compressor 54 will be reduced and it will take a slightly longer period of time than is required when the vehicle is operated at normal highway speeds where the piston 76 is reciprocated more often to produce a greater pumping rate to thereby increase the pressure level within the control chambers 42 quicker.

In either case during the pump-up phase of operation the compressor operation is engine speed responsive and all the air discharged from the compressor 54 is trapped within the control chambers 42 of the pneumatic leveler units 12, 14 since during the pump-up phase the undamped valve assembly 182 has the valving element 188 continually closed.

An important aspect of this invention is that during the pump-up phase all the inlet air passing through the collector tank 156 is passed through the desiccant cartridge 162 so that entrained moisture will be removed from the air before it is pumped into the system conduits. Since the compressor is located on the engine block usually at the front end of most vehicles and the pneumatic leveler units 12, 14 are often located adjacent the rear axle housing the conduits can have a length in the order of 10 to 12 feet and often have low spots therein which would tend to collect moisture if it were not removed from the system by the desiccant 162. Such collection at low points can constitute a serious problem where the vehicle is subjected to ambient temperature conditions below 32° F. Under these conditions there is a tendency for such water collection to freeze and block the system conduits.

The provision of the filter cartridge 162 completely eliminates this problem making the system suitable for use on vehicles that operate under extreme temperature and humidity conditions. For purposes of the present invention "dry air" or "dry" shall mean a condition within the system wherein water will not condense at dew point temperatures down to a minimum temperature of system operation in the order of −40° F. to −30° F.

Normal system operation

Once the vehicle chassis is raised back to its level position by the pneumatic lever units 12, 14 the pump-up phase of operation is finished. At this time the valving element 188 is positioned to open the axial passageway 204 through the unitary resilient valving element 200 and across the control orifice 206 therein.

When the vehicle is at an intermediate load condition there will be an intermediate pressure level within the control chamber which will cause a predetermined rate of exhaust flow across the control orifice 206 through the exhaust conduit 152 and into the inlet fitting 154 to the collector tank 156, the shunt passageway 159, thence back through the outlet opening 158 and the conduit 160 to the inlet valve assembly 104 on the air side of the diaphragm 92.

More particularly, during normal operation, when the undamped valve assembly 182 is opened to exhaust air from the control chambers 42, the air supply for the compressor 54 is no longer from ambient outside air but rather is taken from air exhausted from the control chambers 42.

With the vehicle at a parked position, the units 12, 14 are not subjected to any dynamic road movements. As soon as any excess air flows into the chambers 42 the end mounts 18, 20 move slightly apart to cause the valving element 188 to assume the open position shown in FIG. 2. The excess air then flows across the axial passageway 204 of the resilient valving element 200 back to the collector tank 156 where it passes through the shunt passageway 159 in bypassed relationship to the desiccant cartridge 162. Since moisture is previously removed by the cartridge 162 the air circulated during normal operation is dry. It remains dry since it shunts the cartridge during normal operation.

In contrast to static, parked operating conditions, when the vehicle is taken out on the road there will be ordinary road movements between the sprung and unsprung mass of the vehicle that will cause the top and bottom end mounts 18, 20 to move toward one another and apart from one another. As pointed out above, when the vehicle is fully loaded the undamped valving element 188 will remain closed for a greater period of time during such transient road movements; when the vehicle has intermediate loads thereon the undamped valve assembly 182 will have an opened-to-closed ratio which is more than when the vehicle is heavily loaded; at light loads the opened-to-closed ratio will be even more than when the vehicle is heavily or intermediately loaded.

In any case, however, as compared to static conditions the dynamic load movement of the vehicle will cause more exhaust flow from the units than under static conditions. However, under dynamic conditions the compressor is operating to make-up for such exhaust.

In accordance with certain principles of the present invention, the ratio of opened-to-closed exhaust of valve 182 will tend to maintain a control pressure within the control chambers 42 of the vehicle approximately the same under both static and dynamic operating conditions at any given load.

Another important aspect of the present invention is that the gas volume of the air collector tank 156 is selected to collect excess air flow from the control chambers 42 under all load conditions for later use in the system and to do so without causing a substantial pressure level within the tank. The relief valve 172 thus remains closed under normal operating conditions. The compressor 54 will use the gas volume of tank 156 to maintain a pressure supply sufficient for the leveler units 12, 14 to support the leveled load under both static and dynamic vehicle operation.

The cross-sectional area of the orifice 206 is sized to further regulate the exhaust flow from the control chambers when the undamped valve assembly 182 is open. This additional control is necessary to prevent over-exhaust of the units 12, 14 when there is a high pressure within the control chambers 42 as when the vehicle is heavily loaded and the undamped valve assumes its open position. If there were such an excessive exhaust flow, the leveler units would tend to move below the desired height relationship and then it would take a period of time before a compressor with displacements preferred for this application could supply a sufficient amount of compressed air to the control chamber 40 to make up the excessive exhaust.

The orifice 206 is sized to regulate the exhaust of excess air flow from the control chambers 42 under all phases of operation and the volume of the air collector tank 156 is selected so that under normal operating conditions there will be a controlled pressure condition within the system on the exhaust side of the compressor in the range of from 8 to 12 p.s.i.g. which is below the pressure at which the relief valve 172 will open to allow air flow from the system back to atmosphere. Hence, under normal operating conditions, the system operates substantially closed and uses the dried inlet air that is directed into the system during the pump-up phase to maintain the vehicle level. Only a change in the loading conditions will cause any further addition or exhaust of air from the system.

Exhaust phase of operation

When the vehicle is stopped and the load is maintained thereon, the undamped exhaust valve 182 will be closed to trap compressed air in the control chamber to maintain the curb height relationship.

However, when the vehicle is unloaded as is typically the case when the engine is stopped and the passengers leave the car, the load is reduced and as a result the main primary suspension springs will raise the vehicle chassis upwardly of the ground engaging suspension components and as a result the top and bottom end mounts 18, 20 of the leveler units 12, 14 will move apart from one another to cause the cylindrical member 22 to move upwardly of the end cap 196 as shown in FIG. 2, thereby to move the spring valving element 188 out of engagement with the resilient unitary valve seat element 200. When the valve is opened the high pressure air in the control chamber 40 will bleed across the control orifice 206 and pass into the passageway 159 of the collector tank 156. When the vehicle is stopped, the compressor 54 is turned off and as a result the excess exhaust air from the control chambers 42 will rapidly increase the pressure within the air collector tank 156. When it reaches the blow-off level of the relief valve 172, in accordance with certain principles of the present invention, the dried air within the system is directed back through the cartridge 162 for removing moisture that has been previously collected therein and then exhausted it and excess air across the valving element 174 to atmosphere.

This back flow of dry air through the desiccant in the cartridge 162 gives a partial regeneration of the material in the cartridge 162 thereby to prolong the total operative life of the desiccant requiring only a periodic replacement of an air dryer assembly such as that shown at 215 in FIG. 4. The intake air path in this unit is shown by the solid line with directional arrows marked 280 in FIG. 4; the recirculating normal operation air path is shown by the dot-dash line with directional arrows, marked 282; and the exhaust air path is shown by the dotted line with directional arrows marked 284.

The exhaust phase of operation thus reduces the pressure within the control chambers 42 to a point where the auxiliary load supporting action of the pneumatic leveler units 12, 14 along with that of the primary suspension springs is such that the vehicle chassis will no longer be raised above its curb height and once it is returned to its curb height the undamped valve 182 assumes the position shown in FIG. 2 and the pressure level within the control chambers 42 and the tank 156 is at a reduced point which will produce little or no effect on the suspension characteristics of the vehicle.

Additionally, the pressure level within the system is such that when the vehicle is initially started and the compressor 54 is operated to carry out another pump-up phase it will have little or no supercharge on the inlet air and as a result there will be only a minimal pressure buildup in the control chambers 42 under light loading conditions required to maintain the vehicle level.

System characteristics

In one working embodiment of the invention, the system components have the following mechanical characteristics:

| Component: | Characteristics |
|---|---|
| Pneumatic leveler units 12,14. | Maximum pressure, 150 p.s.i.g. Minimum pressure, 8 p.s.i.g. |
| Control chamber 40 | Mean height volume, 70 cubic inches. |
| Collector tank 156 | 100–120 cubic inches. |
| Desiccant cartridge 162. | 60 cubic inches; 20 cubic inches, silica gel. |
| Valve assembly 172 | 8–12 p.s.i.g. |
| Compressor 54 | Displacement, .2 cubic inch/stroke. |
| Relief Valve assembly 130. | Blow-off pressure, 160 p.s.i.g. |
| Orifice 206 | Diameter, .020 inch. |

With this arrangement, when the engine is operated at idle speeds, the compressor 54 pumps up the pneumatic lever units 12, 14 against an additional load of 1200 pounds including 900 pound passenger load and 300 pound trunk load within 5–7 minutes. At highway speeds of 70 m.p.h., the compressor 50 pumps up the same load within 3 minutes.

Following the pump-up phase of operation, the vehicle system operates with a dry charge of circulating air without dumping any excess air back to atmosphere and does so by maintaining pressure conditions within the air collector tank 156 in the range of from 0 to 12 p.s.i.g. a pressure level which can be easily contained in the operating system without excessive leaks to atmosphere.

While the embodiments of the present invention, as herein disclosed, constitute a preferred form, it is to be understood that other forms might be adopted.

What is claimed is:

1. In an automatic vehicle leveling system the combination of a compressor having an inlet and an outlet, a pneumatic leveler unit adapted to be connected between the sprung and unsprung mass of a vehicle, said leveler unit having a control chamber with an inlet connected to the compressor outlet and an outlet, undamped two-position valve means on said leveler unit responsive to the height relationship between the sprung and unsprung masses to control the pressure in the control chamber to maintain a predetermined height relationship between the masses, said valve means opening and closing in response to normal vehicle road movements to continually exhaust air from the control chamber during normal vehicle road movements, air supply means for connecting said compressor inlet to atmosphere during a pump-up phase, said supply means including means for drying air supplied to said compressor during the pump-up phase, said supply means including a tank having a volume selected to collect excess dry air exhausted from said control chamber under dynamic conditions following leveling, and means including said tank for supplying dry air to said compressor during dynamic vehicle operation without drawing air from atmosphere.

2. An assembly for removing moisture from an air supply of an automatic vehicle leveling system of the type including a continuously operated compressor that periodically draws air in from atmosphere for charging a control chamber of a leveler unit of the type adapted to be connected between the sprung and unsprung mass of a vehicle, the control chamber having an inlet and an outlet and wherein the inlet is directly connected by a conduit to the outlet of the compressor comprising: an air collector tank having an inlet and an outlet, a first conduit directly connecting the outlet of the air chamber to the inlet of the air collector tank, a second conduit for directly connecting the outlet of the tank directly to the inlet of the compressor, an inlet check valve to said tank and a relief valve from said tank, a desiccant cartridge within said tank, means defining a fluid flow path in shunt relationship to the desiccant cartridge for passage of air from the outlet of the leveler unit to the inlet of the compressor during normal dynamic operation of the vehicle, means including said inlet check valve for directing air from atmosphere through the desiccant cartridge into the compressor inlet during initial pressurization of the leveler unit required to level the vehicle following loading, said desiccant cartridge removing moisture from the volume of air required to pressure the leveler for maintaining a predetermined height relationship between the sprung and unsprung mass of the vehicle whereby dry air will pass through the system during normal vehicle operation, said tank having a volume to prevent a pressure build-up therein in excess of the relief setting of said relief valve under dynamic vehicle operation following leveling to prevent exhaust from the system under such dynamic conditions, and means including said relief valve for exhausting air from the leveler unit through the desiccant cartridge when the vehicle is unloaded and directing it to atmosphere to cause partial regeneration of the desiccant cartridge by removal of moisture from the cartridge by the exhaust flow therethrough.

3. An automatic vehicle leveling system comprising a compressor having an inlet and an outlet, a pair of leveler units adapted to be connected between the sprung and unsprung mass of the vehicle, each of said leveler units including first and second telescoping relatively movable members, means for sealing between said relatively movable members to define a pressurizable control chamber, at least one of said leveler units including an inlet and an outlet, means connecting the outlet of the compressor to the inlet of said one of said leveler units, means connecting the inlet of said compressor to the outlet of said one of said leveler units, said last mentioned means including an air collector tank, an intake valve to said air collector tank and a relief valve therefrom, an undamped valve on said one of said leveler units controlling flow of fluid into and from the control chambers of said leveler uints in response to ordinary road movements between the sprung and unsprung mass of the vehicle, orifice means between said leveler outlet and said tanks including a cross-sectional flow area large enough to prevent an excessive pressure build-up in said control chambers under low vehicle load conditions and a cross-sectional flow area small enough to prevent excessive exhaust flow of fluid from said control chambers under heavy vehicle load conditions, said air collector tank being sized to receive exhaust flow from said control chambers through said orifice means and maintain a pressure build-up within the collector tank below the setting of said relief valve to prevent exhaust of air to atmosphere under dynamic vehicle operation, a desiccant cartridge within said air collector tank interposed between said intake valve and the inlet to the compressor and operative to remove water from air drawn through the intake valve during periods when the vehicle is leveled, means defining an air path through said air collector tank in shunt relationship to the desiccant cartridge for passage of dry air between said leveler units and said compressor during dynamic operation of the vehicle, said relief valve on said air collector tank bleeding excess fluid from the system when the vehicle is unloaded to cause said undamped valve to open, and means connecting said relief valve to said cartridge to cause exhaust flow from the leveler units to backflow through the desiccant cartridge to remove water from the cartridge thereby to partially regenerate the desiccant cartridge each time the vehicle is unloaded.

References Cited
UNITED STATES PATENTS

| | | | |
|---|---|---|---|
| 2,969,975 | 1/1961 | Chuba | 267—65 D |
| 3,082,018 | 3/1963 | Smirl | 280—124 F |

PHILIP GOODMAN, Primary Examiner

U.S. Cl. X.R.

267—65 D